(12) United States Patent
Jaeger

(10) Patent No.: US 9,604,736 B2
(45) Date of Patent: Mar. 28, 2017

(54) SPACECRAFT ACTUATOR WHEEL WITH INTEGRATED BATTERY AND FUEL STORAGE

(71) Applicant: NOVAWURKS, INC., Los Alamitos, CA (US)

(72) Inventor: Talbot Jaeger, Los Alamitos, CA (US)

(73) Assignee: NOVAWURKS, INC., Los Alamitos, CA (US)

( * ) Notice: Subject to any disclaimer, the term of this patent is extended or adjusted under 35 U.S.C. 154(b) by 0 days.

(21) Appl. No.: 14/620,617

(22) Filed: Feb. 12, 2015

(65) Prior Publication Data
US 2016/0236801 A1 Aug. 18, 2016

(51) Int. Cl.
| | |
|---|---|
| B64G 1/42 | (2006.01) |
| B64G 1/28 | (2006.01) |
| B64G 1/40 | (2006.01) |
| B64G 1/10 | (2006.01) |
| B64G 1/64 | (2006.01) |
| B64G 1/44 | (2006.01) |

(52) U.S. Cl.
CPC .............. B64G 1/425 (2013.01); B64G 1/10 (2013.01); B64G 1/283 (2013.01); B64G 1/285 (2013.01); B64G 1/286 (2013.01); B64G 1/402 (2013.01); B64G 1/428 (2013.01); B64G 1/64 (2013.01); B64G 1/44 (2013.01); B64G 2001/1092 (2013.01)

(58) Field of Classification Search
CPC . B64G 1/24; B64G 1/28; B64G 1/281; B64G 1/283; B64G 1/285; B64G 1/286; B64G 1/085; B64G 1/646; B64G 2001/1092; B64G 1/1085
See application file for complete search history.

(56) References Cited

U.S. PATENT DOCUMENTS

| | | | |
|---|---|---|---|
| 3,728,900 A | 4/1973 | Engelking | |
| 4,508,297 A * | 4/1985 | Mouilhayrat | B64G 1/1007 244/165 |
| 4,752,884 A * | 6/1988 | Slafer | B64G 1/24 244/164 |
| 4,892,174 A | 1/1990 | Takekado | |
| 5,058,834 A | 10/1991 | Hubert | |
| 6,019,319 A * | 2/2000 | Falbel | B64G 1/285 244/165 |
| 6,135,392 A * | 10/2000 | Wakugawa | B64G 1/283 244/164 |
| 8,352,101 B2 | 1/2013 | Thomas et al. | |
| 8,726,762 B2 | 5/2014 | Rogers et al. | |
| 9,231,323 B1 * | 1/2016 | Jaeger | F16L 37/002 |

(Continued)

*Primary Examiner* — Philip J Bonzell
*Assistant Examiner* — Christopher Hutchens
(74) *Attorney, Agent, or Firm* — Russo & Duckworth, LLP; David G. Duckworth

(57) ABSTRACT

An improved spacecraft actuator wheel is provided which can be operated as a momentum wheel, a reaction wheel or a gimbal. The actuator wheel has a central cavity. One or more battery modules are located within the actuator wheel's central cavity. The battery modules supply power to one or more electronic components affixed to the actuator wheel or mounted on the spacecraft frame via an electrical harness. In addition, the actuator wheel's central cavity is pressurizeable for storing spacecraft propellant which can be controllably diverted to the spacecraft's thrusters through conduits and flow valves.

17 Claims, 8 Drawing Sheets

(56) References Cited

U.S. PATENT DOCUMENTS

2007/0069081 A1* 3/2007 Roder ................... B64G 1/283
 244/165
2016/0130019 A1* 5/2016 Jaeger ..................... B64G 1/40
 62/7

* cited by examiner

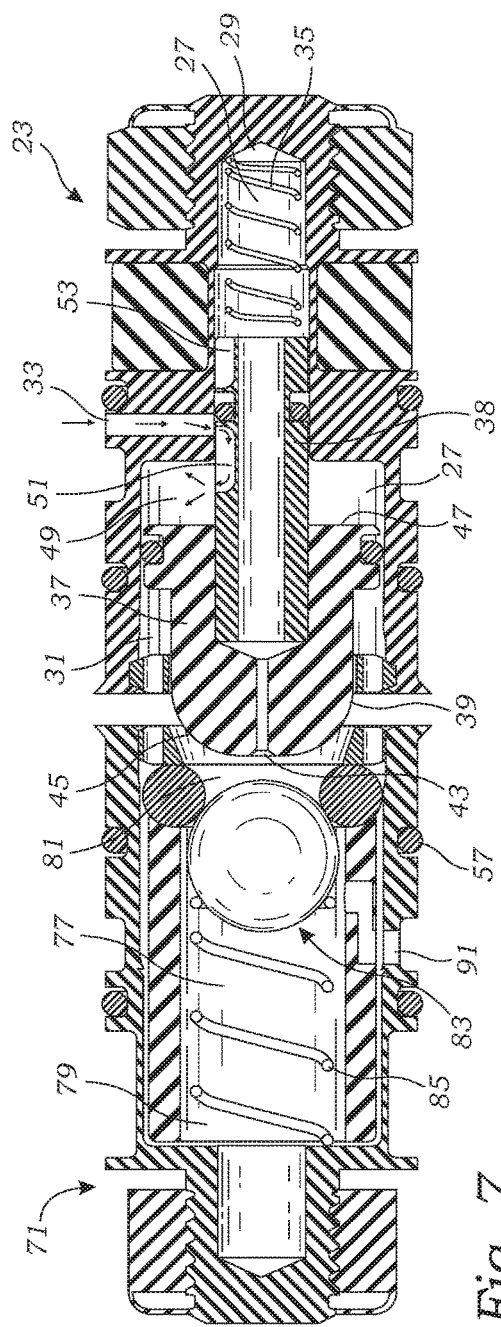
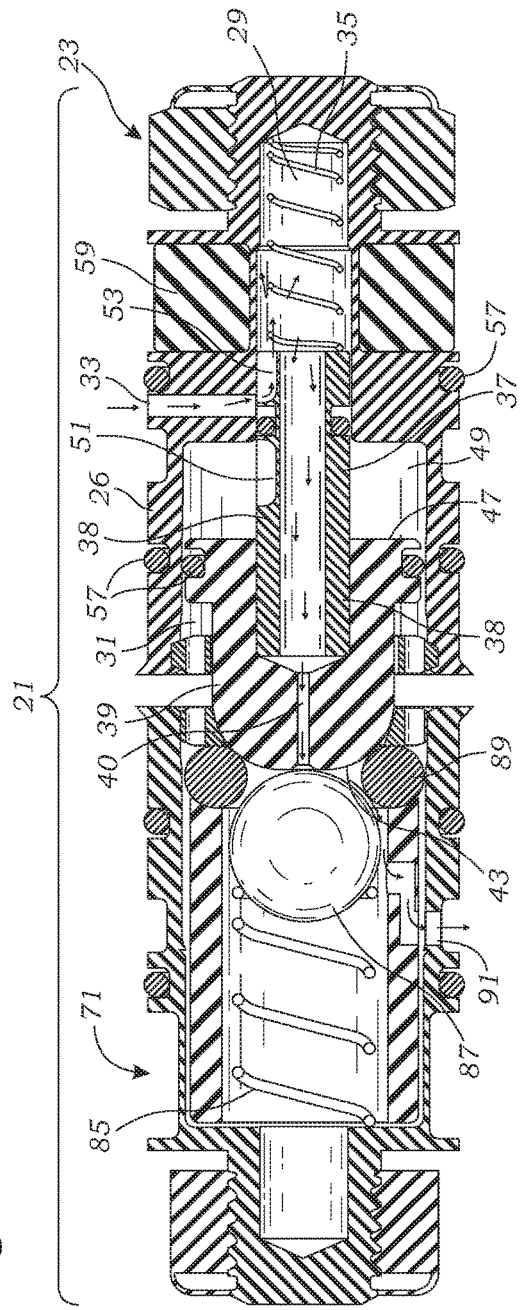
Fig. 7
Fig. 8

SPACECRAFT ACTUATOR WHEEL WITH INTEGRATED BATTERY AND FUEL STORAGE

This invention was made with government support under contract no. HR0011-14-C-0023 awarded by the Defense Advanced Research Projects Agency. The government has certain rights in the invention.

BACKGROUND OF THE INVENTION

The present invention relates generally to spacecraft engineering and design. More particularly, the present invention relates to a spacecraft actuator that can function as a momentum wheel, a reaction wheel or a gimbal. More specifically, the present invention relates to battery storage and fuel storage.

Spacecraft, satellites, or other vehicles in orbit experience a number of factors that can cause unwanted changes in attitude. Control systems, also known as attitude control systems, are utilized to control and adjust the attitude of a spacecraft. These control systems can include various rotating inertia members such as reaction wheels, control momentum gyroscopes and similar actuators. Current spacecraft employ at least three actuator wheels functioning as momentum wheels and/or reaction wheels.

A reaction wheel is a type of attitude control device that can be used in attitude control systems to exchange angular momentum with a spacecraft. They do not move the spacecraft from one place to another. Reaction wheels can only rotate a spacecraft around its center of mass by very small amounts. To this end, a reaction wheel includes a flywheel mounted on a frame or housing of the spacecraft. An electric motor produces a torque along a spin axis of the flywheel so that the flywheel rotates to produce a force that opposes motion in one plane. This is accomplished by equipping the spacecraft with a controller to control the electric motor and resulting rotation of the flywheel. When the flywheel's rotational velocity is changed, the spacecraft counter-rotates proportionately through conservation of angular momentum.

A rotating wheel is sometimes operated as a momentum wheel when it is rotated at a constant (or near-constant) rotational velocity in order to imbue a spacecraft with a large amount of stored angular momentum. As such, the spacecraft's rotational dynamics are altered so that disturbance torques perpendicular to one axis of the spacecraft (the axis parallel to the flywheel's spin axis) do not result directly in spacecraft angular motion about the same axis as the disturbance torque. Instead, they result in angular motion of that spacecraft axis about a perpendicular axis. This stabilizes the spacecraft axis to point in a nearly-fixed direction, allowing for a less-complicated attitude control system.

A control momentum gyroscope is another type of attitude control device. A control momentum gyroscope typically includes a spinning rotor, for example, and a flywheel mounted on one or more motorized gimbals that tilt the rotor's angular momentum. As the rotor tilts, the changing angular momentum causes a gyroscopic torque that rotates the spacecraft. The spin axis of the control momentum gyroscope can be changed by moving the rotor using the gimbal assembly. Control momentum gyroscopes differ from reaction wheels in that reaction wheels apply torque simply by changing rotor spin speed, while control momentum gyroscopes tilt the rotor's spin axis without necessarily changing its spin speed.

Even more recently, spacecraft have been designed by combining homogeneous cells, also referred to herein as satlets. The term "satlet" refers to a cell of a cell-based spacecraft where each satlet possesses the traditional architecture of a spacecraft including structure, power, fuel, attitude control and determination, satellite processing, etc. Thus, preferably each satlet has its own frame that incorporates multiple spacecraft subsystems including solar panels, batteries, one or more actuator wheels (functioning as a momentum wheel and/or reaction wheel), image sensors, thermal control systems, a propulsion system including a fuel tank and thrusters, and electronics for command and data handling, data sharing, attitude control and position control. Preferably, each satlet is substantially identical so as to be manufactured inexpensively and quickly. The satlets are aggregated together to form a single geographically co-located spacecraft which can increase performance with increased numbers to support payload functions such as communications and surveillance.

Unfortunately, reaction wheels, momentum wheels, and gimbals (collectively referred to herein as "actuator wheels") consume significant space and add substantial weight to a spacecraft and particularly on a satlet. Similarly, batteries and fuel tanks take up significant space and add substantial weight to spacecraft and particularly to a satlet.

Thus, with the smaller satlet design, it would be desirable to provide a spacecraft actuator wheel that can function as a momentum wheel, a reaction wheel or a gimbal which integrates batteries and a fuel tank.

SUMMARY OF THE INVENTION

The present invention addresses the aforementioned disadvantages by providing an improved spacecraft actuator wheel mounted on a spacecraft frame wherein the actuator wheel is rotatable 360°. Preferably, the spacecraft actuator wheel can be operated as a momentum wheel, a reaction wheel, or a gimbal. The actuator wheel may be constructed of any shape so as to rotate about its center of mass. However, it is preferred that the actuator wheel is substantially cylindrical and rotates about the cylinder's central axis. To rotate the actuator wheel, the spacecraft includes an electric motor, a power supply for supplying electric power to the electric motor, and a controller connected to the power supply and motor for controlling the rotation of the actuator wheel.

The power supply includes one or more battery modules (also referred to herein as "batteries" or "battery storage") which supply power to the spacecraft electronics via an electrical harness. Preferably the battery modules are affixed to the actuator wheel so as to rotate with the rotation of the actuator wheel. In a non-preferred embodiment, the battery modules are affixed to the exterior of the actuator wheel. However, in the preferred embodiment, the actuator wheel is constructed to include an exterior housing forming a central cavity wherein the battery modules may be situated In a preferred embodiment, the actuator wheel's central cavity is pressurizeable and utilized as the propellant fuel storage tank for the satlet. The batteries and fuel tank may be integrated within the actuator wheel by various constructions as can be determined by those skilled in the art. For example, the batteries may be positioned exterior to the actuator wheel's central cavity at the actuator wheel's periphery. Alternatively, the batteries may be positioned within the central cavity which forms the propellant fuel tank.

Other features and advantages of the present invention will be appreciated by those skilled in the art upon reading the detailed description which follows with reference to the attached drawings.

BRIEF DESCRIPTION OF THE DRAWINGS

FIG. 7 is a side cut-away view of the male and female valve assemblies providing a fluid connection between the rotatable actuator wheel and the remaining stationary portion of the satlet wherein the male valve assembly piston is being actuated to an extended locking condition;

FIG. 8 is a side cut-away view of the male and female valve assemblies providing a fluid connection between the rotatable actuator wheel and the remaining stationary portion of the satlet wherein the male valve assembly piston has been extended so as to lock male and female valve assemblies together;

DETAILED DESCRIPTION OF THE PREFERRED EMBODIMENTS

Figure 1:
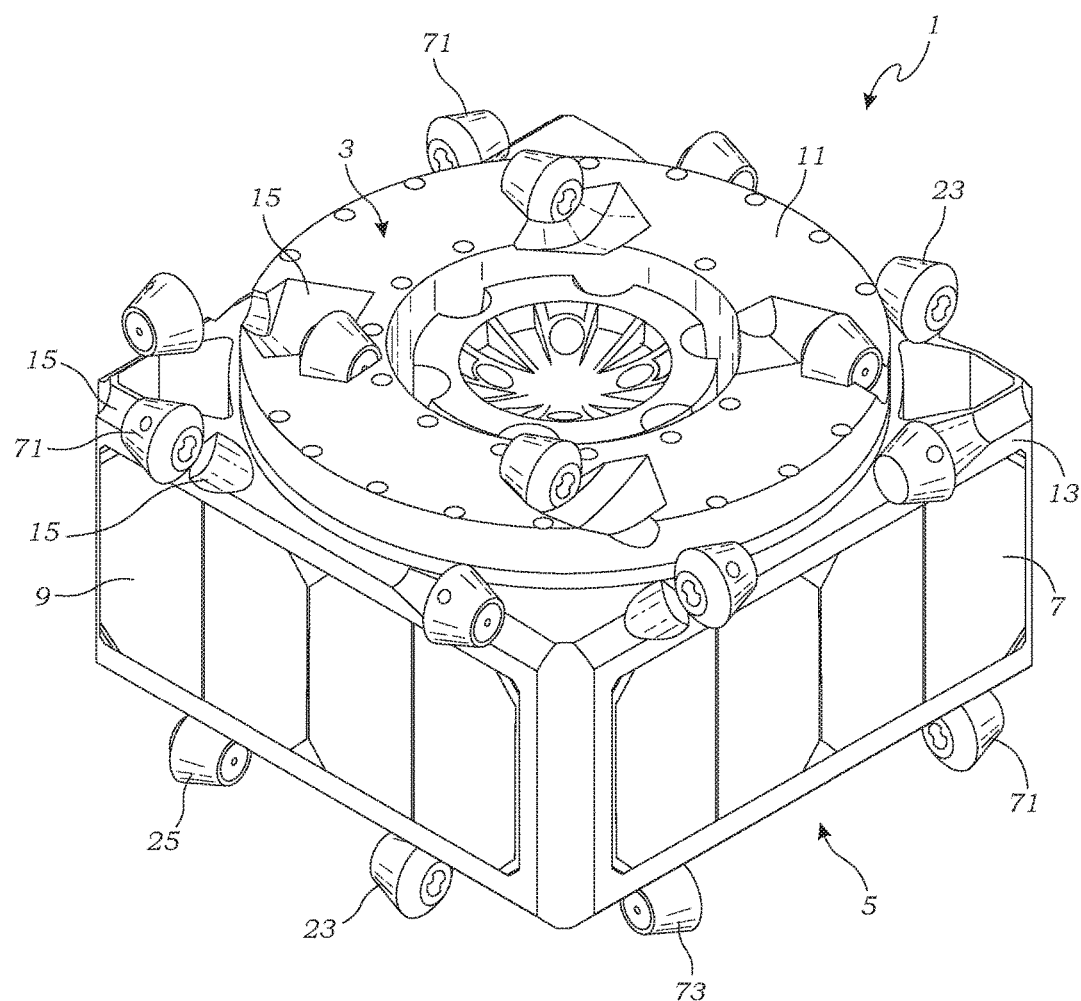
FIG. 1 is a perspective view of a satlet incorporating traditional spacecraft architecture with an integrated actuator wheel of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 2:
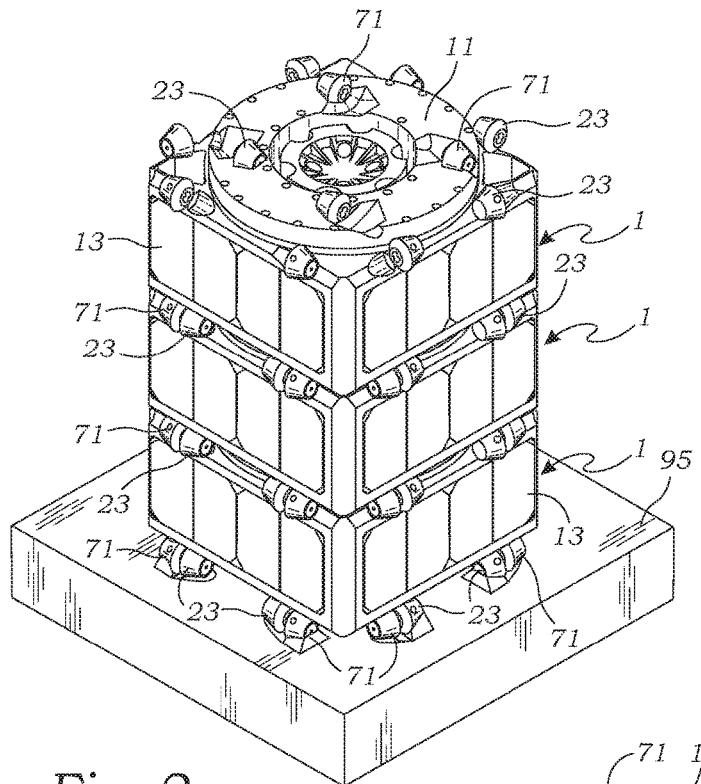
FIG. 2 is a perspective view illustrating three (3) satlets connected in a stacked condition utilizing the actuator wheels of the present invention.
Figure 3:
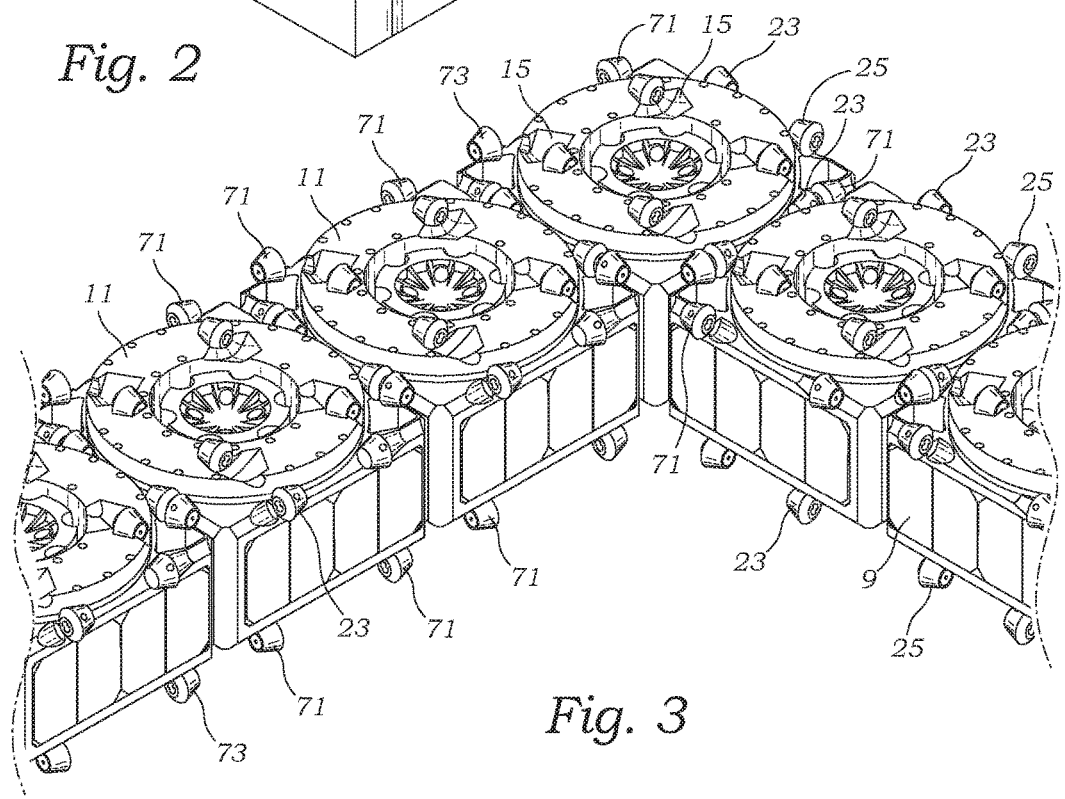
FIG. 3 is a top perspective view illustrating six (6) satlets connected side-by-side utilizing the actuator wheels of the present invention.

With reference to the FIGS. 1-5, the present invention is directed to a spacecraft including one or more actuator wheels 11. Though not intended to be limited, the spacecraft is ideally constructed to include a plurality of satlets 1 integrated to form a spacecraft. As illustrated in FIGS. 1-3, a preferred satlet 1 has a top 3, a bottom 5, and four sides 7. Furthermore, each satlet 1 includes a frame 13 for mounting various spacecraft components. The term "frame" is intended to be interpreted broadly to include any structure or housing.

The satlet housing 13 supports multiple spacecraft subsystems including solar panels 9, batteries 42, one or more actuator wheels 11 (functioning as a momentum wheel, reaction wheel and/or gimbal), image sensors, thermal control systems, propulsion system including a fuel tank and thrusters, and electronics for command and data handling, data sharing, attitude control, and position control.

Figure 4:
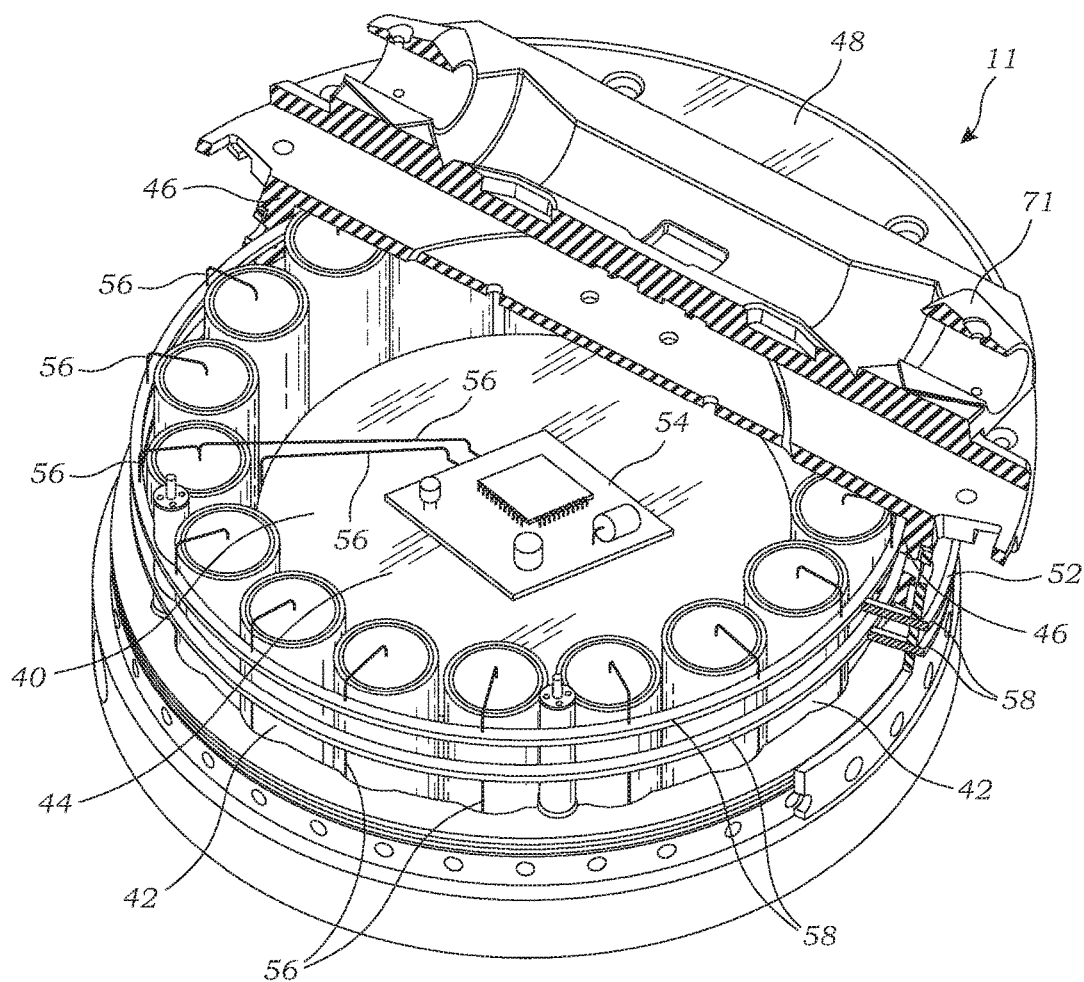
FIG. 4 is a top perspective view illustrating an actuator wheel of the present invention with side cut-away view of the top portion so as to partly show the inside of the actuator wheel.
Figure 5:
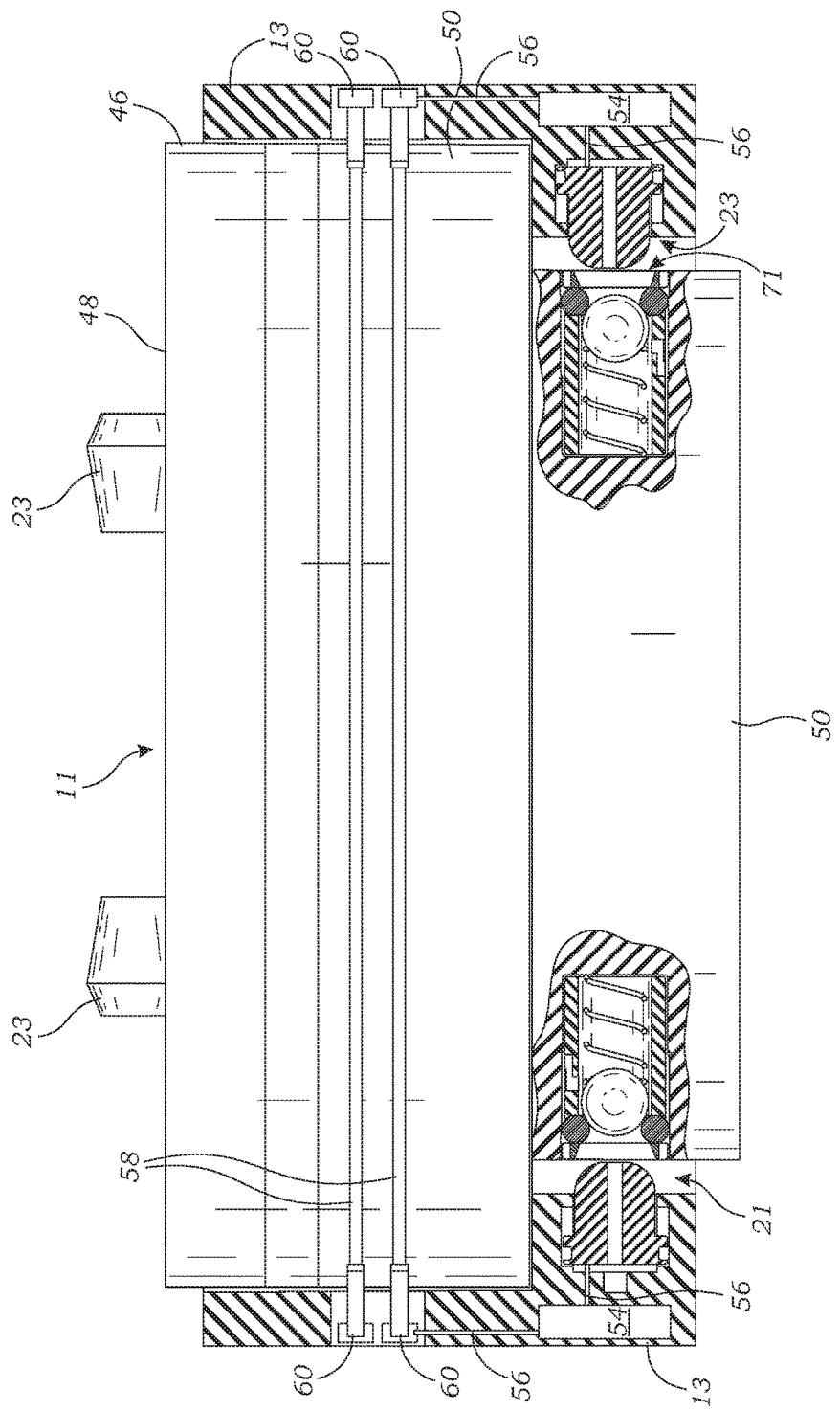
FIG. 5 is a side cut-away view illustrating an actuator wheel within a satlet housing.

With reference primarily to FIGS. 4 and 5, the satlets 1 are constructed to integrate the batteries 42 and/or the fuel tank 44 within the satlet's actuator wheel 11. Preferably, the actuator wheel 11 is cylindrical or substantially cylindrical. Alternatively, although not shown in the figures, the actuator wheel 11 may be an alternative shape. In all configurations, the actuator wheel 11, battery modules 42 and fuel storage combination 11 spins about an axis at its center of mass. In a preferred embodiment illustrated in FIGS. 4 and 5, the actuator wheel 11 is cylindrical and hollow to form an exterior housing 46 having a top wall 48, a bottom wall 50, and a cylindrical sidewall 52 which forms a central cavity 40.

Figure 6:
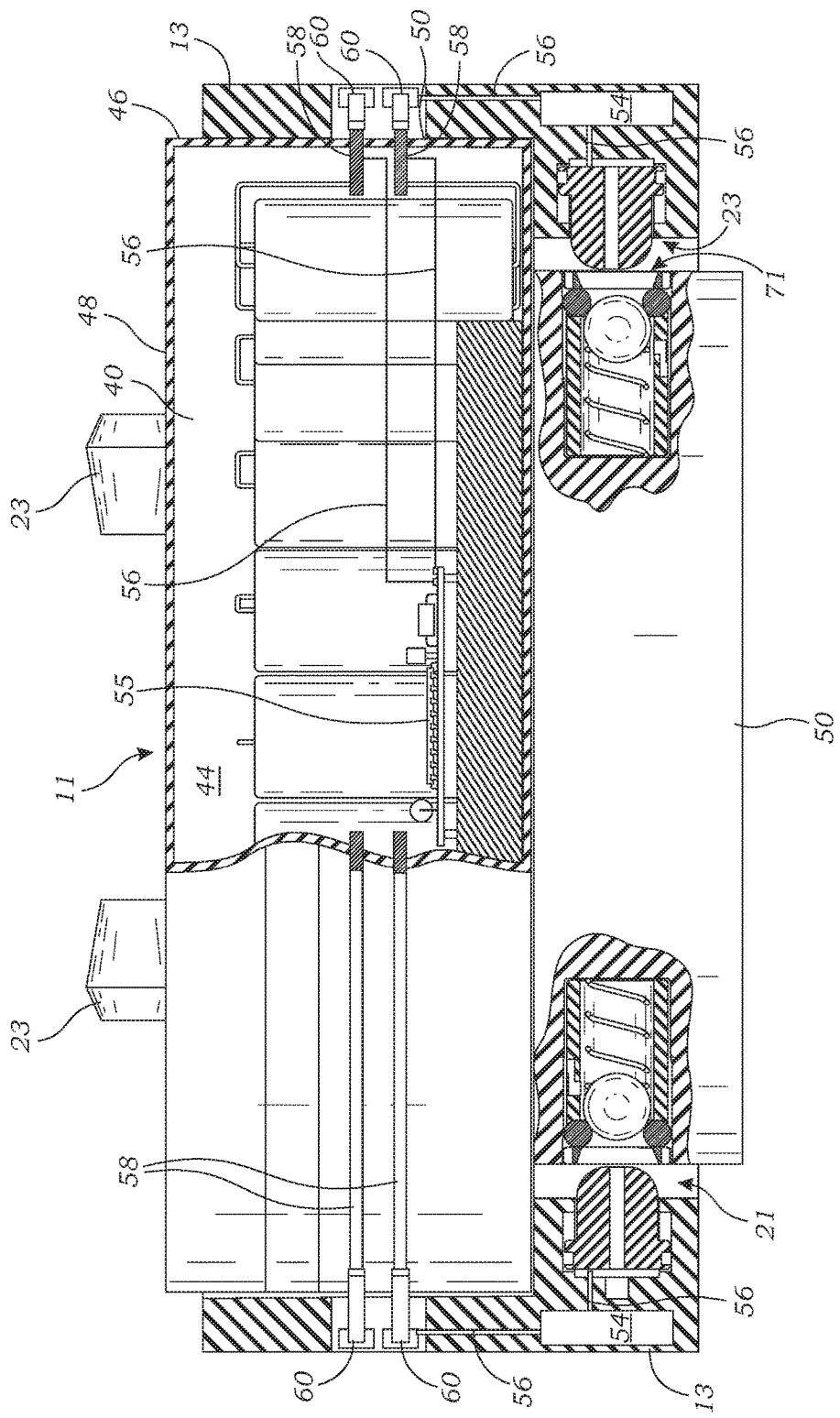
FIG. 6 is a side cut-away view illustrating an actuator wheel within a satlet housing of FIG. 5, including an opening illustrating the actuator wheel's interior cavity.

In an embodiment not shown in the figures, the satlet's batteries 42 may be affixed to the actuator wheel's periphery, exterior to the actuator wheel's central cavity 44. Alternatively, as illustrated in FIGS. 4 and 6, the batteries 42 may be positioned within the interior of the satlet's actuator wheel's central cavity 40. To maintain weight distribution and to maximize angular momentum, preferably two or more battery modules 42 are evenly positioned within the cavity 40 toward the actuator wheel's periphery adjacent and interior to the actuator wheel's sidewall 52. Additional electronic components 55 may be located in the actuator wheel's cavity 40, and an electrical harness including electrical wires 56 may be located within the actuator wheel's cavity 40 to transmit power from the battery modules 42 to such electronics 55. As illustrated in FIGS. 5 and 6, additionally each satlet may include an electrical slip ring (having a one or more rings 58 and or more brushes 60) or the like to transfer power and electrical signals from the battery modules 42 affixed to the rotatable actuator wheel 11 to electrical wires 56 and then to one or more satlet electronic components 54 located exterior to the actuator wheel. Slip rings and other constructions for transmitting electrical power and electrical signals between a stationary member and a rotating member are well known to those skilled in the art and are not described in further detail herein.

Preferably, the actuator wheel's cavity 40 is pressurizeable to form a pressure vessel for storing spacecraft propellant. In this embodiment, the satlet includes fuel lines in the form of fluid tight conduits and connectors for transporting propellant from the central cavity 40 to one or more thrusters. In addition, the satlet includes one or more valves for controlling the flow of fluid from the cavity 40 to the one or more thrusters. A preferred propellant is R134 tetrafluoroethane, though other cold gases or mono-propellants such as hydrazine would also be acceptable. Alternatively, the premixed constituents of bi-propellants may be stored within the actuator wheel's central cavity.

Constructions for transferring fluid from a rotating body (such as the actuator wheel 11) to a stationary body (such as the satlet's housing 13) are well known to those skilled in the art. For example, the satlet may include one or more couplings (not shown) at the actuator wheel's center of mass which provide both a structural connection of the actuator wheel to the satlet's housing and a fluid connection between the actuator wheel and satlet's housing. However, in a preferred embodiment illustrated in FIG. 5, propellant is transferred between the actuator wheel 11 and the housing 13 by a pair of interface connectors 21 located at opposite sides of the actuator wheel's sidewall 52. Each connector 21 includes male valve assembly 23 affixed to the satlet housing and a female valve assembly 71. As would be understood by those skilled in the art, the male valve assemblies 23 can couple with their respective mating female valve assemblies 71 only when the actuator wheel is not rotating and the actuator wheel has been rotated to align the male and female valve assemblies so as to connect.

As illustrated in FIGS. 6-11, the preferred male valve assembly 23 includes a central bore 27. Preferably, the central bore 27 has a circular cross-section which has a smaller diameter towards its proximal end 29 and a larger diameter at its distal end 31. Furthermore, the male valve assembly's central bore is connected to a fuel line 33 which radially projects through the valve assembly's housing towards the central bore's proximal end.

The male valve assembly 23 also includes a piston 37. As illustrated in FIGS. 6-11, a preferred piston 37 is constructed to include two components including a smaller diameter shaft 38 and a larger diameter piston head 39. Preferably, the piston head 39 has a diameter sufficiently large to form a substantially gaseous tight seal within the central bore 27. Furthermore, the piston may include an O-ring concentrically positioned around the piston head to form a gaseous tight seal between the piston head and the cylindrical surface of the central bore 27. Advantageously, the difference in diameter between the piston's shaft 38 and piston head 39 provides the piston head with a circular collar region 47. The smaller diameter shaft 38 slidably resides within the smaller proximal end 29 of the central bore 27. Meanwhile, the larger diameter piston head 39 slidably resides in the larger distal end 31 of the central bore 27. The piston 37 includes a central conduit 40 which extends the entire length of the piston through the shaft 38 and piston head 39.

The male valve assembly's piston 37 is capable of moving proximally and distally within the central bore 27. Movement of the piston can be actuated by various electrical or mechanical apparatus known to those skilled in the art. The preferred interface connector 21 includes a piston which is projected distally using pneumatic actuation, but moved proximally using an electromagnetic actuator.

To enable the piston 37 to be pneumatically extended, the piston shaft 38 has a first channel 51 which extends from the fuel line 33 into a chamber 49 formed behind the piston's collar 47. As illustrated in FIG. 7, the release of propellant through the fuel line 33, such as by opening a fuel valve (not shown), allows propellant to flow through the first channel 51 into chamber 49 so as to pneumatically force the piston distally. As illustrated in FIG. 8, the piston is forced distally until the first channel 51 is no longer in fluid communication with the fuel line 33. Preferably an O-ring 57 is provided to provide a fluid tight seal so as to prevent further propellant passing through the first channel 51 into chamber 49.

Figure 9:
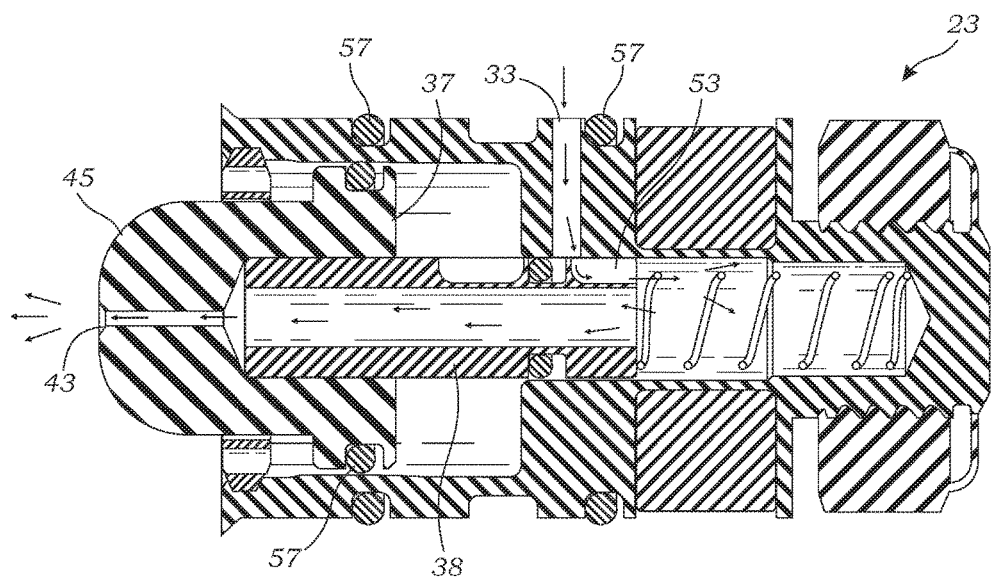
FIG. 9 is a side cut-away view of a male valve assembly wherein its piston has been extended and fluid is traveling through the male valve assembly.

As illustrated in FIGS. 6-11, preferably the piston shaft 38 further includes a second channel 53 which comes into fluid communication with the fuel line 33 when the piston has been extended to a distal position. As illustrated in FIGS. 8 and 9, the second channel 53 connects the fuel line 33 with the male valve assembly's central bore 27 at the central bore's proximal end 29 so as to allow propellant to flow through the fuel line into the central bore 27, and thereafter through the piston's central conduit 40, so as to be ejected from the piston's distal end 43.

To move the piston 37 in the proximal direction, the male valve assembly 23 includes a magnetic actuator including an electrical magnetic field generator, such as a coil winding 59 concentrically positioned around the piston's shaft 38. As understood by those skilled in the art, incorporating magnetic properties into the shaft 38 in cooperation with a controllable electromagnetic field provided by the magnetic field actuator 59 will cause the piston 37 to move in the proximal direction such as illustrated in FIG. 8.

As illustrated in FIGS. 5-11, the interface connector 21 also includes a female valve assembly 71 located at the actuator wheel's periphery for connecting to the male valve assembly 23. As illustrated in FIGS. 7 and 8, the female valve assembly includes a central bore 77 having a proximal end 79 and a distal end 81. The distal end is closeable by a ball valve 83. The ball valve includes a ball 87, an O-ring 89 having an inner diameter smaller than the diameter of the ball, and a helical spring 85 for biasing the ball distally into the O-ring for creating a fluid tight seal. As understood by those skilled in the art, the helical spring 85 maintains the ball valve in a normally closed condition. However, movement of the ball 87 in the proximal direction, such as by engagement by a male valve assembly piston 37, will cause the ball valve to open. The female valve assembly further includes a fuel line 91 so that the female valve assembly's central bore 77 is connected to a fuel source (not shown).

Figure 10:
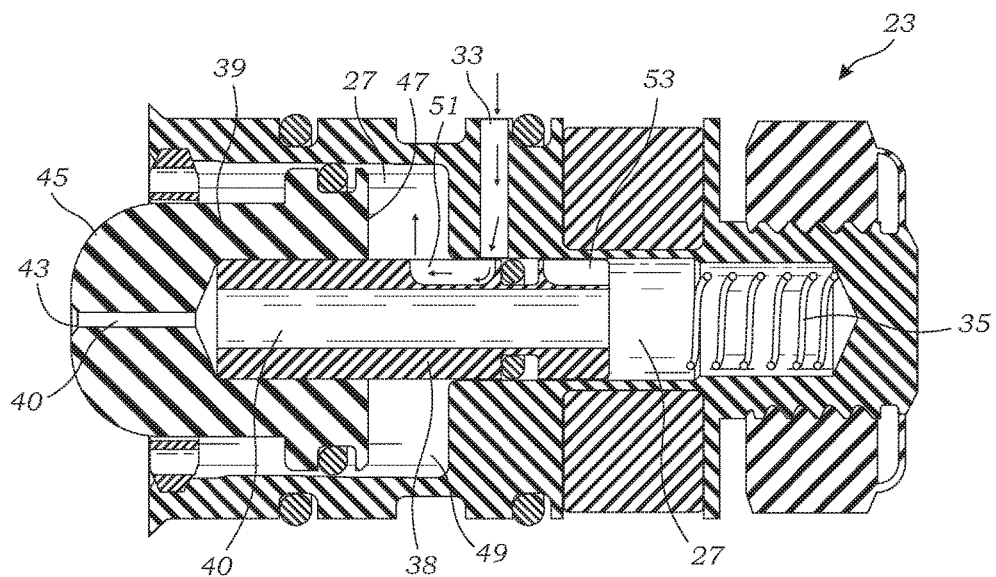
FIG. 10 is a side cut-away view of a male valve assembly of the present invention wherein the male valve assembly's piston is being actuated to an extended condition.

As illustrated in FIGS. 6-11, the connector 21 includes both a male valve assembly 23 and a female valve assembly 71 which are positioned in an inwardly facing coaxially aligned relationship to one another. As illustrated in FIGS. 8 and 10, once an actuator wheel 11 is rotated to align each male valve assembly 23 with its respective female valve assembly 71, the introduction of propellant from fuel line 33 through first channel 51 into the male valve assembly's chamber 49 causes the male valve assembly's piston 37 to move distally into the female valve assembly's receptacle 62 so as to engage and form a fluid tight seal with the female valve assembly's O-ring 89. Though not illustrated in the figures, the piston conduit's distal end has a lateral slit across the divergent nozzle 43 so as to prevent a fluid tight seal between the piston's conduit 40 and the female valve assembly's ball 87. Thus, as illustrated in FIG. 8, when the male valve assembly piston has been moved to a distal "locked" position, gas is freely capable of flowing through the male and female valve assemblies, as controlled by a valve connected to the male valve assembly's fuel line 33. As would be understood by those skilled in the art, the opening of this valve causes propellant to flow from a high pressure region to a low pressure region. When in the "locked" condition, the actuator wheel is stabilized and prevented from rotating, a condition desirable for spacecraft launch.

Figure 11:
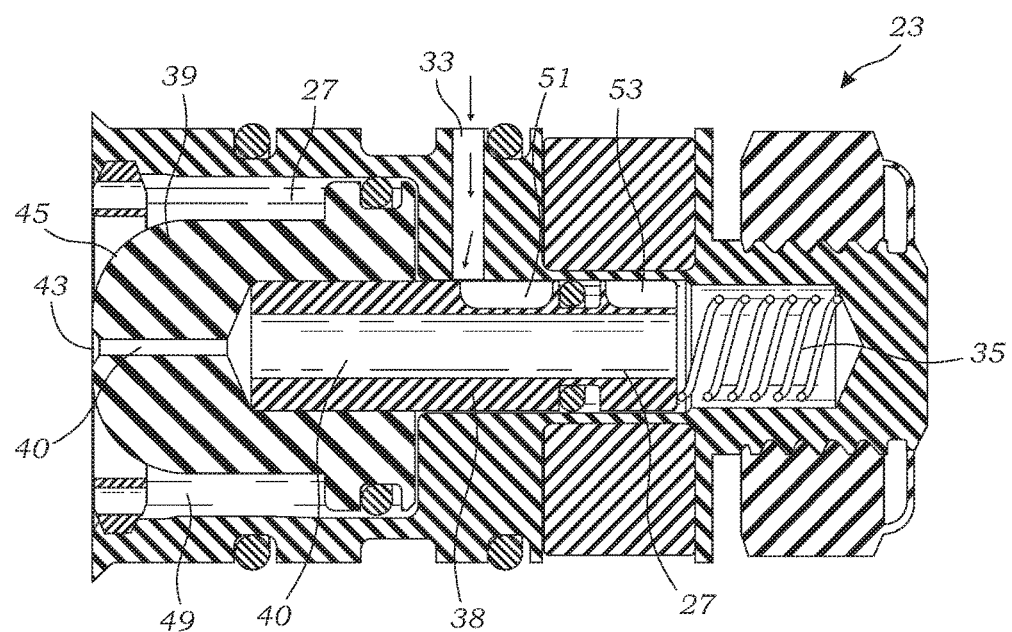
FIG. 11 is a side cut-away view of the male valve assembly wherein the male valve assembly's piston has been retracted so as to allow rotation of the actuator wheel.

As illustrated in FIGS. 5 and 11, disconnection of the male valve assembly from the female valve assembly can be accomplished by energizing the male valve assembly's magnetic coil winding 59 so as to retract the piston 37. Once disconnected, the actuator wheel 11 is free to rotate.

The aggregated satlets 1 may be structurally connected and connected for fluid, power and data transfer by various connectors as can be determined by those skilled in the art. However, with reference particularly to FIGS. 1-3, preferably the satlets 1 are connected by an interface connector 21 which is the same, or substantially the same, as the interface connector 21 used to provide a fluid connection between the satlet's rotatable actuator wheel and non-rotatable frame.

Though not illustrated in detail, each satlet includes fuel lines to transfer fuel from its respective fuel tank throughout the spacecraft's architecture. Preferably, the fuel lines provide conduits which allow propellants to flow from the actuator wheel's central cavity 40 to spacecraft thrusters, or from the actuator wheel's central cavity 40 within one satlet to the actuator wheel's central cavity of another satlet. The satlets further include open and closable valves for permitting or obstructing the flow of propellant. The satlets may contain pumps (not shown) to effect the transfer of propellant to the thrusters, or from one satlet to another. Alternatively, the opening of one or more valves may cause the propellant to flow from a high pressure region in either the first or second satlet to a low pressure region in an alternate satlet.

To rotate the actuator wheel, each satlet includes an electric motor, a power supply for supplying electric power to the electric motor, and a controller connected to the power supply and motor for controlling the rotation of the actuator wheel. Preferably, the controller is also connected to the valve assemblies and pumps (if provided) to control the flow of propellant to the spacecraft thrusters, or the flow of propellant from a first satlet to a second satlet.

The controller may be a general purpose computer or microprocessor including hardware and software as can be determined by those skilled in the art to provide automated or directed control of the rotation of the actuator wheel and activation of the valve assemblies so as to open and close the valves to thereby control the flow of fuel. The controller may be located within the electronics of a single satlet 1, within the aggregate processing of the electronics of two or more satlets, or at a remote location such as on the Earth at a control station.

Advantageously, the actuator wheel 11 can be controlled to function as a momentum wheel, a reaction wheel or a gimbal. When a plurality of satlets are integrated to form a larger spacecraft, as shown in the examples in FIGS. 2 and 3, a plurality of actuator wheels, e.g., three or more, may be controlled to function as momentum wheels, reaction wheels or gimbals.

For example, the actuator wheel 11 can be operated to have a constant, or near-constant, rotational velocity. In this embodiment, the actuator wheel 11 functions as a momentum wheel. In another embodiment, the rotational velocity of the actuator wheel 11 may be changed, causing the spacecraft to counter-rotate proportionately through conservation of angular momentum. In this embodiment, the actuator wheel 11 functions as a reaction wheel. In yet another embodiment, the actuator wheel 11 may be operated as a pivoted support, or gimbal, that allows the rotation of an object, e.g. a telescope or antennae, mounted on the actuator wheel 11. In this embodiment, one or more gimbal motors are utilized to control the rotation and angular position of actuator wheel 11.

While several particular forms of the invention have been illustrated and described, it will be apparent that various modifications can be made without departing from the spirit and scope of the invention. Therefore, it is not intended that the invention be limited except by the following claims. Having described my invention in such terms so as to enable person skilled in the art to understand the invention, recreate the invention and practice it, and having presently identified the presently preferred embodiments thereof,

I claim:

1. A spacecraft comprising:
 a spacecraft frame;
 one or more thrusters mounted to said spacecraft frame;
 one or more electronic components;
 a plurality of actuator wheels rotatably affixed to said spacecraft frame wherein said actuator wheels are rotatable relative to said spacecraft frame and said one or more thrusters;
 one or more battery modules affixed to each of said actuator wheels so as to be rotatable with the rotation of said actuator wheel; and
 an electrical assembly connecting said one or more electronic components and said one or more battery modules for supplying power from said battery modules to said electronic components.

2. The spacecraft of claim 1 wherein at least one actuator wheel is a momentum wheel.

3. The spacecraft of claim 1 wherein at least one actuator wheel is a reaction wheel.

4. The spacecraft of claim 1 wherein at least one actuator wheel is a gimbal.

5. The spacecraft of claim 1 wherein said electronic components are affixed to at least one of said actuator wheels so as to be rotatable with the rotation of said actuator wheel.

6. The spacecraft of claim 1 wherein said electronic components are affixed to said frame so as to not be rotatable with the rotation of said actuator wheels.

7. The spacecraft of claim 1 wherein at least one of said actuator wheels has a central cavity and said battery modules are located in said central cavity.

8. The spacecraft of claim 1 further comprising:
 a pressurizeable central cavity formed within at least one of said actuator wheels;
 a spacecraft propellant within said central cavity;
 one or more fluid conduits connecting said central cavity and said one or more thrusters; and
 one or more valves for controllably allowing or restricting the flow of propellant from said central cavity to said thrusters.

9. A spacecraft comprising:
 a spacecraft frame;
 one or more thrusters mounted on said spacecraft frame;
 a plurality of actuator wheels rotatably affixed to said spacecraft frame wherein each of said actuator wheels have a pressurizeable central cavity and are rotatable relative to said spacecraft frame and said one or more thrusters;
 spacecraft propellant within said central cavities;
 one or more fluid conduits connecting said central cavities and said one or more thrusters;
 one or more valves for controllably allowing or restricting the flow of propellant from said central cavities to said thrusters.

10. The spacecraft of claim 9 wherein at least one actuator wheel is a momentum wheel.

11. The spacecraft of claim 9 wherein at least one actuator wheel is a reaction wheel.

12. The spacecraft of claim 9 wherein at least one actuator wheel is a gimbal.

13. The spacecraft of claim 9 further comprising:
 one or more electronic components;
 one or more battery modules affixed to at least one of said actuator wheels so as to be rotatable with the rotation of said actuator wheel; and
 an electrical assembly connecting said one or more electronic components and said one or more battery modules for supplying power from said battery modules to said electronic components.

14. The spacecraft of claim 13 wherein said electronic components are affixed to at least one of said actuator wheels so as to be rotatable with the rotation of said actuator wheel.

15. The spacecraft of claim 13 wherein said electronic components are affixed to said frame so as to not be rotatable with the rotation of said actuator wheel.

16. The spacecraft of claim 13 wherein said battery modules are located within at least one of said actuator wheels' central cavity.

17. A spacecraft comprising:
- a spacecraft frame;
- one or more thrusters mounted on said spacecraft frame;
- a plurality of actuator wheels rotatably affixed to said spacecraft frame wherein said each of said actuator wheels have a pressurizeable central cavity and are rotatable relative to said spacecraft frame and said one or more thrusters;
- spacecraft propellant within said cavities;
- one or more fluid conduits connecting said central cavities and said one or more thrusters;
- one or more valves for controllably allowing or restricting the flow of propellant from said cavities to said thrusters;
- one or more electronic components;
- one or more battery modules positioned with said actuator wheel's cavities so as to be rotatable with the rotation of said actuator wheels; and
- an electrical assembly connecting said one or more electronic components and said one or more battery modules for supplying power from said battery modules to said electronic components.

* * * * *